(12) United States Patent
Mouquet et al.

(10) Patent No.: US 11,144,962 B2
(45) Date of Patent: Oct. 12, 2021

(54) METHOD FOR MANAGING THE STANDBY STATE OF A MOBILE TERMINAL

(71) Applicant: ORANGE, Issy-les-Moulineaux (FR)

(72) Inventors: Antoine Mouquet, Courbevoie (FR); Ali-Amine Mouafik, Le Gosier (FR)

(73) Assignee: ORANGE, Issy-les-Moulineaux (FR)

( * ) Notice: Subject to any disclaimer, the term of this patent is extended or adjusted under 35 U.S.C. 154(b) by 111 days.

(21) Appl. No.: 16/312,644

(22) PCT Filed: Jun. 22, 2017

(86) PCT No.: PCT/FR2017/051665
§ 371 (c)(1),
(2) Date: Dec. 21, 2018

(87) PCT Pub. No.: WO2017/220942
PCT Pub. Date: Dec. 28, 2017

(65) Prior Publication Data
US 2019/0172092 A1 Jun. 6, 2019

(30) Foreign Application Priority Data

Jun. 24, 2016 (FR) ...................................... 1655908

(51) Int. Cl.
*G06Q 30/02* (2012.01)
*H04W 8/06* (2009.01)
(Continued)

(52) U.S. Cl.
CPC ..... *G06Q 30/0261* (2013.01); *G06Q 30/0267* (2013.01); *H04M 15/66* (2013.01);
(Continued)

(58) Field of Classification Search
CPC ........... H04W 8/02; H04W 8/08; H04W 8/06; H04W 8/16; H04W 8/18; H04W 8/20;
(Continued)

(56) References Cited

U.S. PATENT DOCUMENTS 10,652,793 B2 * 5/2020 Kim et al. ............ H04W 36/12
10,701,216 B2 * 6/2020 Yan et al. ............ H04M 15/66
(Continued)

FOREIGN PATENT DOCUMENTS

WO 2015037820 A1 3/2015
WO 2015063970 A1 5/2015

OTHER PUBLICATIONS

English Translation of Written Opinion of the International Searching Authority dated Nov. 10, 2017 for corresponding International Application No. PCT/FR2017/051665, filed Jun. 22, 2017.
(Continued)

*Primary Examiner* — Meless N Zewdu
(74) *Attorney, Agent, or Firm* — David D. Brush; Westman, Champlin & Koehler, P.A.

(57) ABSTRACT

A method for managing a standby state of a mobile terminal in a data packet network. The method includes: upon opening a connectivity session for a mobile terminal, a mobility management entity of the network receives a list of areas, known as a "PRA list", configured according to a given service and a location of the mobile terminal; when the mobile terminal switches from a "connected" mode to a "standby" mode, the mobile terminal receives the "PRA-list" of areas from the mobility management entity via a network access point; when the mobile terminal enters one of the areas included in the "PRA-list" of areas, it switches from the "standby" mode to the "connected" mode, and transmits a notification to the mobility management entity via a network access point.

12 Claims, 2 Drawing Sheets

(51) Int. Cl.
*H04W 8/02* (2009.01)
*H04W 76/27* (2018.01)
*H04W 64/00* (2009.01)
*H04M 15/00* (2006.01)
*H04W 8/08* (2009.01)
*H04W 4/021* (2018.01)

(52) U.S. Cl.
CPC ............. *H04W 8/02* (2013.01); *H04W 8/06* (2013.01); *H04W 8/08* (2013.01); *H04W 64/00* (2013.01); *H04W 76/27* (2018.02); *H04W 4/021* (2013.01)

(58) Field of Classification Search
CPC ....... H04W 8/183; H04W 8/26; H04W 64/00; H04W 4/02; H04W 4/021; H04W 4/029; H04W 4/06; H04W 76/27; H04W 88/00; H04W 88/02; H04W 88/06; H04W 88/08; H04W 88/18; H04W 28/0226; H04W 68/00; H04W 68/06; H04W 68/003; H04W 76/10; H04W 76/15; H04W 76/16; H04W 40/005; H04W 40/18; H04W 40/20; H04W 40/24; H04W 52/28; H04W 4/50; H04W 4/23; H04W 60/00; H04W 60/04; H04W 76/00; H04W 76/11; H04W 88/14; H04W 88/12; H04W 88/188; H04W 48/20; H04W 48/04; H04W 24/10; H04W 40/248; H04W 8/00; H04W 8/14; H04M 15/00; H04M 15/66; H04M 1/72572; H04M 1/72569; H04M 3/42348; H04M 3/42365; G06Q 30/0261; G06Q 30/0267; G06Q 30/02; G06Q 30/0205; G06Q 30/0251; G06Q 30/0259; G06Q 30/0262; G06Q 30/0265; G06Q 30/0266; G06Q 30/0271; G06Q 30/0268; G06Q 30/0269; G06Q 20/3224; G06Q 20/32; G06Q 20/325
See application file for complete search history.

(56) References Cited

U.S. PATENT DOCUMENTS

| | | | |
|---|---|---|---|
| 2011/0158165 | A1* | 6/2011 | Dwyer et al. ................. 370/328 |
| 2013/0183959 | A1* | 7/2013 | Mihaly et al. ........ H04W 68/02 |
| 2015/0173121 | A1* | 6/2015 | Miklos et al. ...... H04W 76/046 |
| 2015/0365789 | A1* | 12/2015 | Salot et al. ............. H03W 4/02 |
| 2016/0212760 | A1 | 7/2016 | Iwai |
| 2018/0270787 | A1* | 9/2018 | Drevon et al. ........ H04W 68/02 |
| 2018/0376302 | A1* | 12/2018 | Pancorbo Marcos et al. ............. H04W 4/24 |
| 2019/0172092 | A1* | 6/2019 | Mouguet et al. .. G06Q 30/0261 |
| 2019/0222998 | A1* | 7/2019 | Kim et al. ............. H04W 8/08 |
| 2019/0306853 | A1* | 10/2019 | Ishii .................. H04W 72/0413 |
| 2020/0120476 | A1* | 4/2020 | Lee et al. ................ H04W 8/06 |

OTHER PUBLICATIONS

"3rd Generation Partnership Project; Technical Specification Group Services and System Aspects; Policy and charging control architecture (Release 13)." 3GPP TS 23.203, V13.7.0. Mar. 2016.

"3rd Generation Partnership Project; Technical Specification Group Services and System Aspects; General Packet Radio Service (GRPS) enhancements for Evolved Universal Terrestrial Radio Access Network (E-UTRAN) access (Release 10)." 3GPP TS 23.401, V10.2.1. Jan. 2011.

"3rd Generation Partnership Project; Technical Specification Group Services and System Aspects; General Packet Radio Service (GRPS) enhancements for Evolved Universal Terrestrial Radio Access Network (E-UTRAN) access (Release 13)." 3GPP TS 23.401, V13.1.0. Dec. 2014.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)." 3GPP TS 29.274, V14.0.0. Jun. 2016.

International Search Report dated Sep. 29, 2017 for corresponding International Application No. PCT/FR2017/051665, filed Jun. 22, 2017.

Written Opinion of the International Searching Authority dated Sep. 29, 2017 for corresponding International Application No. PCT/FR2017/051665, filed Jun. 22, 2017.

* cited by examiner

METHOD FOR MANAGING THE STANDBY STATE OF A MOBILE TERMINAL

CROSS-REFERENCE TO RELATED APPLICATIONS

This Application is a Section 371 National Stage Application of International Application No. PCT/FR2017/051665, filed Jun. 22, 2017, the content of which is incorporated herein by reference in its entirety, and published as WO2017/220942 A1 on Dec. 28, 2017, not in English.

FIELD OF THE DISCLOSURE

The invention lies in the general field of telecommunications, and relates more particularly to communications of a mobile terminal with a packet data network (or PDN in English) via a cellular access network.

In the context of the present invention, "mobile terminal" denotes any portable object that is able to participate in wireless communications. This mobile terminal may for example be a mobile telephone, or a portable computer, or a digital tablet.

This mobile terminal may be connected and registered with an IP (Internet Protocol) core network by way of any type of access, such as a GSM (Global System for Mobile Communications) network, a UMTS (Universal Mobile Telecommunications System) network, a set of DSL (Digital Subscriber Line) lines, an Ethernet network (ISO/IEC 8802-3 standard), a Wi-Fi network (IEEE 802.11 standard), or an LTE (Long Term Evolution) network.

Even more particularly, the invention relates to the switch from "standby" mode to "connected" mode for a mobile terminal. It is recalled that "standby mode" for a mobile terminal consists in deactivating some of its functionalities so as to save its power and the radio resources of the cell in which it is situated, but without the core network releasing the connectivity session; more precisely, when a mobile terminal is in standby, the core network retains the context of the session (IP address, subscription information, secret keys, and so on), and knows the location of the mobile terminal with a level of accuracy that corresponds to a certain area, called "TA list" (see details below). When the core network receives a data packet intended for a mobile terminal in standby, the network sends one or more messages, called "paging" messages, in said TA list area; now, although it is in standby, the mobile terminal continues to listen for paging messages. When it receives a paging message, it switches from "standby" mode to "connected" mode, and is therefore able to receive said data packet.

The invention may be implemented in particular in an EPC (Evolved Packet Core) architecture, as defined by the 3GPP (Third Generation Partnership Project) on the basis of "Release 8". FIG. 1 schematically shows this EPC architecture, to which there are connected, by way of example, various types of mobile access network, such as GERAN (GSM EDGE Radio Access Network) for GSM, UTRAN (Universal Terrestrial Radio Access Network) for UTMS, or E-UTRAN for LTE.

BACKGROUND OF THE DISCLOSURE

The EPC architecture comprises three main nodes: an MME (English acronym for "Mobility Management Entity"), an S-GW (English acronym for "Serving Gateway"), and a gateway P-GW (English acronym for "Packet Data Network-Gateway"). The role of these nodes is as follows:

the MME is an entity of the control (signaling) plane, whose main role is to manage the mobility procedures (signaling between the nodes of the core network and with the nodes of the access network for mobility);

the S-GW in particular anchors media when the mobile switches radio access point during a session; it also provides functionalities of counting and buffer storing the media intended for an end user when radio connectivity is not yet established;

the P-GW in particular provides IP connectivity to the end users (for example by assigning IP addresses) and counting functionalities and functionalities of applying advanced quality of service (QoS) policies.

In this context, specification document "TS 23.203" from the 3GPP standardization group, version 13.7.0, defines what is called a "PCC architecture" (English acronym for "Policy and Charging Control") that aims to allow dynamic control of the network resources on the basis of information collected by a control entity called "PCRF entity" (English acronym for "Policy and Charging Rules Function"). This information may be information associated with the network (for example the type of radio access, gateway addresses, or the location of the client), associated with a subscriber (for example subscription information), or else associated with an application (for example the type of application or the type of media). The PCRF entity thus adjusts and controls the use of the network resources on the basis in particular of services requested by the subscriber and of his subscriber profile. To this end, the PCRF entity provides a control rule application entity, called "PCEF entity" (English acronym for "Policy and Charging Enforcement Function"), with rules for controlling a communication session between a mobile terminal and a communication network. These control rules are commonly called "PCC rules". The PCEF entity is often formed by a module of the gateway P-GW (mentioned above), which is then controlled by the PCRF.

When an IP connectivity session ("IP CAN session") is opened, the PCEF (P-GW) opens an associated control session with the PCRF, and communicates to it the features requested for this connectivity session. On the basis of these features and other information coming from a plurality of other sources, the PCRF determines the policy (quality of service, pricing to be used, access authorization, and so on) to be applied for the various services available via the current session. This policy may be modified during the session if certain events, set by the operator, occur during the session. On the basis of the pricing rules sent by the PCRF, the PCEF decides or does not decide to open a session with an entity, called OCS entity (English acronym for "Online Charging System"), responsible for monitoring the credit of the subscriber in real time.

According to the latest "Release" of the specifications published by the 3GPP, in particular specification TS 23.203, it is possible to activate a trigger event at the PCEF (P-GW) based on the modification of the user's location data. When this trigger element is armed, the signaling messages exchanged between the MME, the S-GW and the P-GW for managing the connectivity session (creation, modification, closure) have to indicate the user's location, and the MME has to generate a modification of the "IP-CAN session" as soon as the user's location switches. The PCEF (PGW) is thus able to inform the PCRF in real time of the change of the user's location via the control session associated with the connectivity session. The PCRF is then able, on the basis of its configuration, to decide for example on a modification of QoS (for example of bandwidth) or of pricing on the basis of the user's location, and to do so in real time.

The 3GPP specifications provide a plurality of location granularity levels:

cell level (identified by a "cell id" identifier): this is the finest granularity level;

geographical area level (identified by a "tracking area", denoted "TA"): a TA covers one or more cells (depending on the density of the area); and geographical area list level ("tracking area list", denoted "TA list").

Each access point of a mobile network regularly broadcasts a TAI (Tracking Area Identity) identification signal of the TA served by this access point, and each mobile terminal takes into account the identity of the TA in which it is situated, whether it is connected or in standby. Moreover, when a mobile terminal attaches to the network, the network registers it in one or more TAs comprising the TA in which it is situated and provides to it, by way of an "Attach Accept" message, the TA list in which it is registered; likewise, when a mobile terminal changes TA and the new TA is not included in the TA list in which it is registered, the network registers it in one or more TAs comprising the (new) TA in which it is situated and provides to it, by way of a "TAU accept" message, the TA list in which it is registered. This TA list is taken into account by the mobile terminal, whether it is connected or in standby.

When a mobile terminal in "standby" mode enters a TA that does not form part of the TA list in which it is registered, it notifies this to the network by sending a "Tracking Area Update" message, denoted "TAU"; to do this, it switches back to "connected" mode, that is to say it reactivates its radio communication resources. By contrast (still in "standby" mode), in the event of a change of cell or a change of TA within the same TA list, the mobile terminal does not transmit this notification (the network would have been notified of the change of location if the mobile terminal had been in "connected" mode).

Moreover, specification TS 23.401 of the 3GPP, version 13.1.0, defines a procedure for reporting presence in a predefined presence reporting area, called PRA (English acronym for "Presence Reporting Area"), formed of one or more geographical areas TA. This procedure, called "PRA procedure", aims to reduce network traffic caused by a change of location of a mobile terminal by avoiding automatic notification of this change to various entities of the network. According to this procedure, a change of location is notified only when the mobile terminal enters or leaves one of said PRA areas. This PRA procedure is able to be managed by the PCRF or by the OCS entity (mentioned above).

When this PRA procedure is managed by the PCRF, the latter determines, by way of the subscriber's subscription information, whether the connectivity session to be established requires activation of presence reporting. If this is the case, the control entity PCRF sends, to the rule application entity PCEF, a presence reporting area identifier associated with the subscriber when sending control rules to this same entity. The identifier thus indicates to the rule application entity PCEF that presence reporting should be activated, that is to say that the control entity PCRF wishes to be notified when the mobile terminal enters or leaves the presence reporting area associated with the subscriber. The credit management entity OCS may in this case just ask the rule application entity PCEF to be notified of a change of presence reporting area for the same area as the control entity PCRF; this makes it possible in particular to avoid a presence reporting area conflict, which may for example affect the billing of the subscriber's activities.

When the PRA procedure is not managed by the PCRF, the credit management entity OCS may manage it itself by sending, to the rule application entity PCEF, a locally defined presence reporting area identifier. The credit management entity OCS thus activates presence reporting itself, and indicates its desire to be notified when the mobile terminal enters or leaves the presence reporting area identified by the identifier sent to the rule application entity PCEF.

Nowadays, network operators want to put in place advertising services involving sending a certain advertising message to users entering a certain commercial area (for example a shopping center); of course, the sponsors of such an advertising service want the advertising message to be sent to all of the terminals entering this commercial area.

In accordance with the PRA procedure described above, when a PCRF entity determines that a mobile terminal is implicated in an advertising service requiring an upstream location notification, the PCRF asks the PCEF (P-GW) to notify it of changes of location for this mobile terminal when the latter enters or leaves the set of areas concerned by the advertising service. This request is then transmitted to the S-GW entity and then to the MME entity in accordance with the IP connectivity session creation procedures (comprising the "create session request" and "create session response" messages) described in specifications TS 23.401 and TS 29.274 of the 3GPP.

However, as explained above, a mobile terminal in "standby" mode switches back to "connected" mode only if the movement of the mobile terminal leads to the mobile terminal leaving the TA list in which it is registered; if the PRA implicated in the advertising service is contained entirely in the TA list, a mobile terminal in standby could enter or leave this PRA while at the same time remaining in the same TA list, such that it will remain in standby and will not receive the advertising message.

SUMMARY

The present invention therefore relates, according to a first aspect, to a method for managing the standby state of a mobile terminal in a packet data network, comprising the following steps:

upon opening of a connectivity session for a mobile terminal, a mobility management entity of said network receives a list of areas, called "PRA list", configured as a function of a given service and of the location of said mobile terminal, when the mobile terminal switches from "connected" mode to "standby" mode, the mobile terminal receives said list of areas "PRA list" from said mobility management entity via an access point of the network, and when the mobile terminal enters one of the areas forming the list of areas "PRA list", it switches from "standby" mode to "connected" mode, and sends a notification to said mobility management entity via an access point of the network.

By virtue of these provisions, the implementation of message broadcast services (for example advertising messages) is improved, by allowing terminals that are initially in standby to access them. That being said, the method according to the invention avoids the automatic general upstream transmission of a notification: this transmission takes place only for well-defined activities, such as an advertising service in a shopping center; the network is thus protected from excessive reporting.

According to particular features, if said mobile terminal is in "standby" mode when it then leaves one of the areas forming said list of areas "PRA list", then the mobile terminal switches from "standby" mode to "connected" mode, and sends a notification to said mobility management entity via an access point of the network.

By virtue of these provisions, when said mobile terminal leaves the area that it entered previously in accordance with the steps described concisely above, it may advise this to the manager of said service, which will know that there is then no need to send a message relating to the service to this mobile terminal.

According to a second aspect, the invention relates to various devices.

It thus relates, first of all, to a mobile terminal. Said mobile terminal is noteworthy in that it has means for:

receiving, when it switches from "connected" mode to "standby" mode, a list of areas, called "PRA list", from a mobility management entity via an access point of the network, and when it enters one of the areas forming said list of areas "PRA list", switching from "standby" mode to "connected" mode, and sending a notification to said mobility management entity via an access point of the network.

According to particular features, said mobile terminal furthermore has means for switching, when it leaves one of the areas forming said list of areas "PRA list" in "standby" mode, from "standby" mode to "connected" mode, and sending a notification to said mobility management entity via an access point of the network.

The invention also relates, second of all, to a mobility management entity of a packet data network. Said management entity is noteworthy in that it has means for sending, to an access point of the network to which a given mobile terminal is connected, when said mobile terminal switches from "connected" mode to "standby" mode, a list of areas, called "PRA list", configured as a function of a given service and of the location of the mobile terminal.

The invention also relates, third of all, to an access node of a packet data network. Said access node is noteworthy in that it has means for sending, to a mobile terminal, when said mobile terminal switches from "connected" mode to "standby" mode, a list of areas, called "PRA list", configured as a function of a given service and of the location of the mobile terminal.

The advantages afforded by these devices are essentially the same as those afforded by the corresponding method outlined concisely above.

The invention also targets a packet data network, comprising:

at least one mobile terminal such as described concisely above, at least one management entity such as described concisely above, and at least one access node such as described concisely above.

It will be noted that it is possible to produce these devices in the context of software instructions and/or in the context of electronic circuits.

The invention also targets a computer program downloadable from a communication network and/or stored on a computer-readable medium and/or able to be executed by a microprocessor. This computer program is noteworthy in that it comprises instructions for executing the steps of the standby state management method outlined concisely above when it is executed on a computer.

The advantages afforded by this computer program are essentially the same as those afforded by said method.

BRIEF DESCRIPTION OF THE DRAWINGS

Other features and advantages of the invention will emerge on reading the detailed description below of particular embodiments, given by way of non-limiting example. The description makes reference to the accompanying figures, in which.

DETAILED DESCRIPTION OF ILLUSTRATIVE EMBODIMENTS

Figure 1:
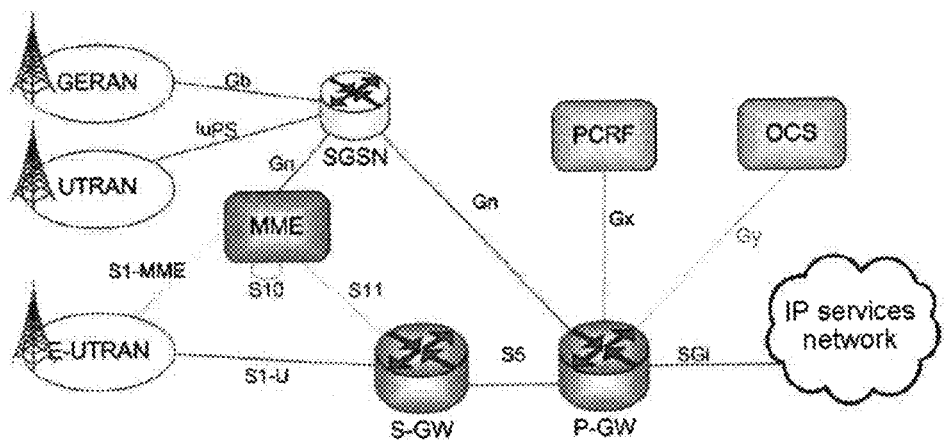
FIG. 1 shows a conventional EPC network architecture.

FIG. 1 schematically shows an EPC architecture, to which there are connected, by way of example, various types of mobile access network, such as GERAN (GSM EDGE Radio Access Network) for GSM, UTRAN (Universal Terrestrial Radio Access Network) for UTMS, or E-UTRAN for LTE.

A description will now be given of one embodiment of the invention that uses a procedure for putting a mobile terminal into standby, showing an evolution of a conventional procedure called "S1 release".

This "S1 release" procedure is described in Section 5.3.5 of specification TS 23.401, v10.2.1, of the 3GPP. It may for example be initiated by an eNodeB (access point of the E-UTRAN network, connected to the S-GW via the interface S1-U and to the MME via the interface S1-MME), or by an MME. The "S1 release" procedure makes it possible to release all of the virtual channels (or "bearers" in English) of a mobile terminal on the interface S1-U, regardless of the number of IP sessions and of existing IP-CAN virtual channels, which are nevertheless kept in the core network.

Figure 2:
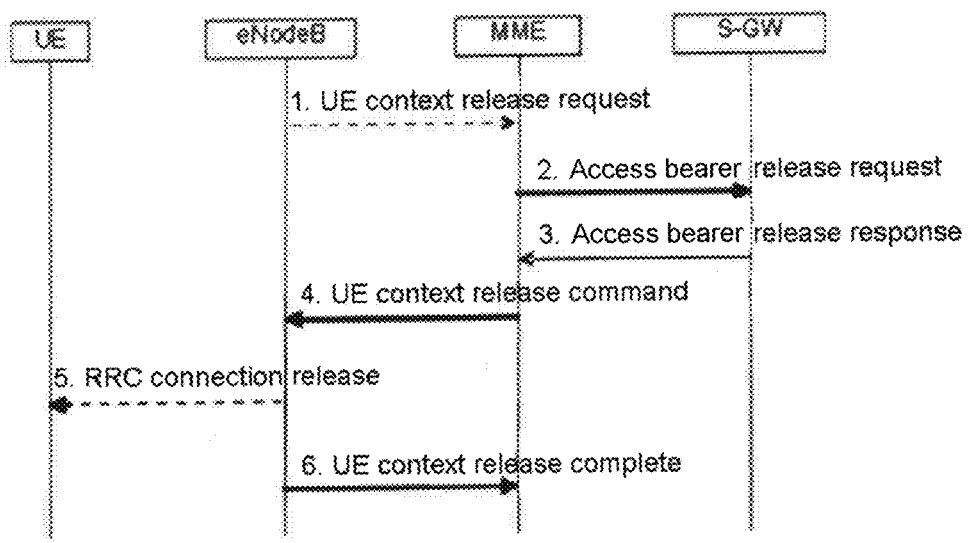
FIG. 2 schematically shows the conventional procedure called "S1 release"

As illustrated in FIG. 2, the conventional "S1 release" procedure comprises the following steps.

In a step E1, an MME receives (for example, from an eNodeB) a standby request relating to a mobile terminal (denoted UE for "User Equipment", i.e. "user device", in FIG. 2) situated in the cell served by this eNodeB.

In a step E2, the MME sends, to the S-GW, a request to release the virtual channels (bearers) used by this mobile terminal.

In a step E3, the S-GW sends a receipt acknowledgement to the MME.

In a step E4, the MME sends a receipt acknowledgement to the eNodeB.

In a step E5, the eNodeB sends, to the mobile terminal, a notification to release their mutual radio connection, for example using the "Radio Resource Control" (RRC) signaling protocol.

Lastly, in a step E6, the eNodeB sends, to the MME, a confirmation of execution of said connection release.

Figure 3:
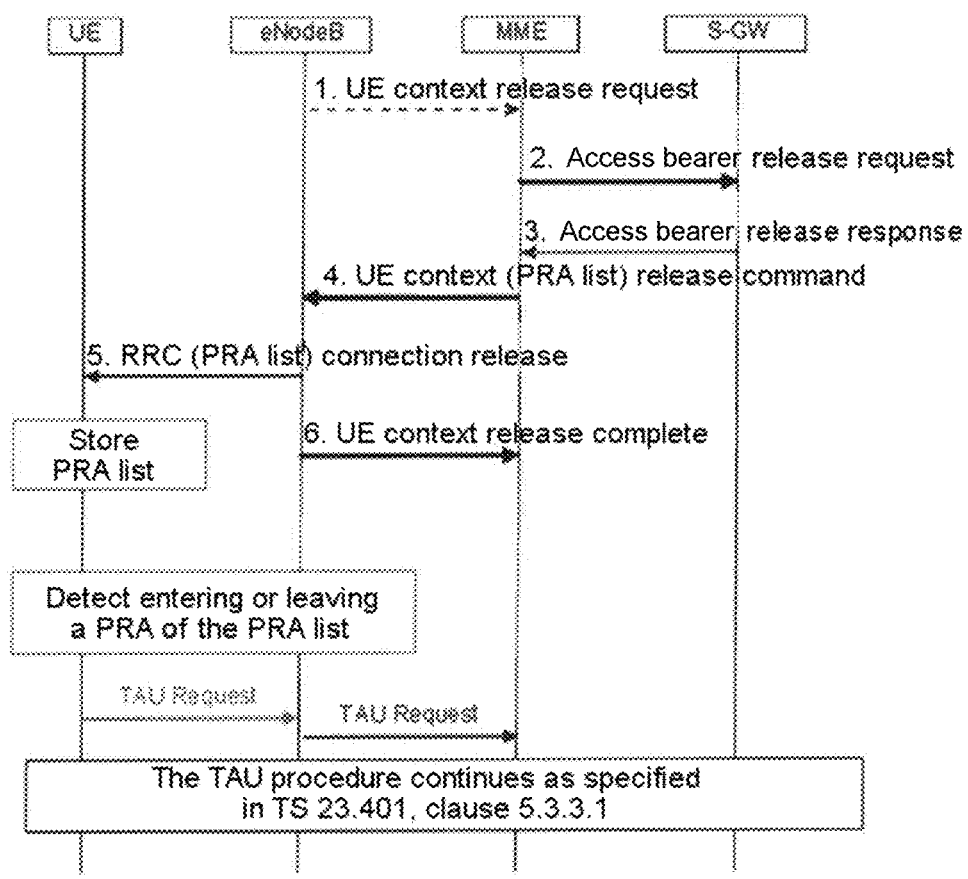
FIG. 3 shows a procedure for putting a mobile terminal into standby according to one embodiment of the invention.

A description will now be given, with reference to FIG. 3, of one embodiment of the invention.

In a first phase, upon opening of a connectivity session (IP CAN session) for a mobile terminal, the PCRF transmits, to the MME (via the P-GW and the S-GW), a list of areas, which will be called "PRA list", configured as a function of a particular message broadcast service (for example for advertising messages) targeted at a set of mobile terminals. The PCRF also has to specify the PRA areas for which it wishes to be notified, whether the mobile terminal is in "standby" mode or in "connected" mode.

This list of areas may for example conveniently be constructed on the basis of the location of the mobile terminal. Preferably, the set of areas included in this "PRA list" is strictly contained in the TA list in which the mobile terminal is registered. This may involve a small number of areas of this TA list that are close to the position of the mobile terminal, the probability of the mobile terminal entering an area further away without switching back to "connected" mode in the meantime being deemed to be low.

In a second phase, the mobile terminal switches from "connected" mode to "standby" mode. This second phase comprises the following steps.

Steps E'1 to E'3 are identical to steps E1 to E3 described above with reference to FIG. 2.

In a step E'4, the MME sends a receipt acknowledgement to the eNodeB, as in the conventional procedure, but including in it a list of areas, which will be called "PRA list".

In a step E'5, the eNodeB sends, to the mobile terminal, a notification to release their mutual radio connection, as in the conventional procedure, but including in it said list of areas "PRA list", which is then registered by the mobile terminal. In this respect, it is important to note that, in the conventional "S1 release" procedure, no list of areas (not even the TA list) is transmitted to the mobile terminal.

Lastly, in a step E'6, the eNodeB sends, to the MME, a confirmation of execution of said connection release, as in the conventional procedure.

In a third phase, when the mobile terminal enters or leaves one of the areas forming the "PRA list", it switches from "standby" mode to "connected" mode, and notifies the MME (for example by way of a conventional TAU message, via the eNodeB). The MME then informs the PCRF of this in accordance with the conventional procedure.

The invention may be implemented within communication network nodes, for example mobile terminals, mobility management entities or network access points, by way of software and/or hardware components.

The software components may be integrated into a conventional computer program for managing a network node. It is for this reason, as indicated above, that the present invention also relates to a computer system. This computer system includes, as is conventional, a central processing unit using signals to control a memory, and an input unit and an output unit. In addition, this computer system may be used to execute a computer program including instructions for implementing the standby state management method according to the invention.

Specifically, the invention also targets a computer program downloadable from a communication network and comprising instructions for executing the steps of a standby state management method according to the invention when it is executed on a computer. This computer program may be stored on a computer-readable medium and may be able to be executed by a microprocessor.

This program may use any programming language, and take the form of source code, object code or intermediate code between source code and object code, such as in a partially compiled form, or in any other desirable form.

The invention also targets an information medium that is non-removable or partly or fully removable, computer-readable, and including instructions of a computer program such as mentioned above.

The information medium may be any entity or device capable of storing the program. For example, the medium may comprise a storage means, such as a ROM, for example a CD-ROM or a microelectronic circuit ROM, or a magnetic recording means, such as a hard disk, or else a USB key (or "USB flash drive" in English).

On the other hand, the information medium may be a transmissible medium such as an electrical or optical signal, which may be routed via an electrical or optical cable, by radio or by other means. The computer program according to the invention may in particular be downloaded from an Internet network.

As a variant, the information medium may be an integrated circuit in which the program is incorporated, the circuit being designed to execute or to be used in the execution of the standby state management method according to the invention.

Although the present disclosure has been described with reference to one or more examples, workers skilled in the art will recognize that changes may be made in form and detail without departing from the scope of the disclosure and/or the appended claims.

The invention claimed is:

1. A method for managing a standby state of a mobile terminal in a packet data network, comprising:
   upon opening of a connectivity session for a mobile terminal, a mobility management entity of said network receiving a list of areas, called a Presence Reporting Area (PRA) list, configured as a function of a given service and of a location of said mobile terminal,
   the mobile terminal being registered by the packet data network in a Tracking Area List associated with at least one access node to which the mobile terminal is connected;
   in response to the mobile terminal switching from a connected mode to a standby mode, the mobility management entity sending, to the at least one access node of the network to which the mobile terminal is connected, said PRA list, and the at least one access node of the network sending to the mobile terminal receiving said PRA list; and
   in response to the mobile terminal moving, in the standby mode, from one of the areas belonging to the PRA list to another area of the PRA list, while remaining in the same Tracking Area List;
   the mobile terminal switching from the standby mode to the connected mode, and
   sending a tracking area update notification to said mobility management entity via the at least one access node of the network.

2. The method according to claim 1, wherein the method further comprises:
   in response to the mobile terminal attaching to the packet data network or changing to a new Tracking Area, the mobile terminal receiving the Tracking Area List in which the mobile terminal is registered by the packet data network, and wherein the areas belonging to the PRA list are strictly contained in the Tracking Area List.

3. A mobile terminal comprising:
   a processor; and
   a non-transitory computer-readable medium comprising instructions stored thereon, which when executed by the processor configure the mobile terminal to perform acts comprising:
   receiving, in response to the mobile terminal switching from a connected mode to a standby mode, a list of areas, called a Presence Reporting Area (PRA) list, from a mobility management entity of a packet data network via at least one access node of the packet data network;

the mobile terminal being registered by the packet data network in a Tracking Area List associated with at least one access node to which the mobile terminal is connected; and in response to the mobile terminal moving, in standby mode, from one of the areas belonging to said PRA list to another area of the PRA list, while remaining in the same Tracking Area List;

switching the mobile terminal from the standby mode to the connected mode, and sending a tracking area update notification to said mobility management entity via the at least one access node of the packet data network.

4. The mobile terminal according to claim 3, wherein the instructions further configure the mobile terminal to:

receive, in response to the mobile terminal attaching to the packet data network or changing to a new Tracking Area, the Tracking Area List in which the mobile terminal is registered by the packet data network, wherein the areas belonging to the PRA list are strictly contained in the Tracking Area List.

5. A mobility management entity of a packet data network, the mobility management entity comprising:

a processor; and a non-transitory computer-readable medium comprising instructions stored thereon, which when executed by the processor configure the mobility management entity to perform acts comprising:

upon opening of a connectivity session for a mobile terminal, the mobility management entity of said network receiving a list of areas, called a Presence Reporting Area (PRA) list, configured as a function of a given service and of a location of said mobile terminal, the mobile terminal being registered by the packet data network in a Tracking Area List associated with at least one access node to which the mobile terminal is connected;

in response to said mobile terminal switching from a connected mode to a standby mode sending, to the at least one access node of the packet data network to which the mobile terminal is connected, the PRA list; and in response to the mobile terminal moving, in the standby mode, from one of the areas belonging to the PRA list to another area of the PRA list, while remaining in the same Tracking Area List and the mobile terminal switching from the standby mode to the connected mode, receiving a tracking area update notification to from the mobile terminal via an access node of the network.

6. The mobility management entity according to claim 5, wherein the mobile terminal receives, in response to the mobile terminal attaching to the packet data network or changing to a new Tracking Area, the Tracking Area List in which the mobile terminal is registered by the packet data network, and -wherein areas belonging to the PRA list are strictly contained in the Tracking Area List.

7. An access node of a packet data network, the access node comprising:

a processor; and a non-transitory computer-readable medium comprising instructions stored thereon, which when executed by the processor configure the access node to perform acts comprising:

in response to a mobile terminal switching from a connected mode to a standby mode in the packet data network, the mobile terminal being registered by the packet data network in a Tracking Area List associated with the access node to which the mobile terminal is connected;

receiving from a mobility management entity of said network a list of areas, called a Presence Reporting Area (PRA) list, configured as a function of a given service and of a location of said mobile terminal; and sending, to the mobile terminal, the PRA list; and in response to the mobile terminal moving, in the standby mode, from one of the areas belonging to the PRA list, to another area of the PRA list, while remaining in the same Tracking Area List;

receiving a tracking area update notification from the mobile terminal; and sending the tracking area update notification to said mobility management entity.

8. The access node according to claim 7, wherein the mobile terminal receives, in response to the mobile terminal attaching to the packet data network or changing to a new Tracking Area, the Tracking Area List in which the mobile terminal is registered by the packet data network, and wherein the areas belonging to the PRA list are strictly contained in the Tracking Area List.

9. A packet data network, which comprises:

a mobile terminal comprising:

a first processor; and a first non-transitory computer-readable medium comprising instructions stored thereon, which when executed by the first processor configure the mobile terminal to perform acts comprising:

receiving, in response to the mobile terminal switching from a connected mode to a standby mode, a list of areas, called a Presence Reporting Area (PRA) list, from a mobility management entity via at least one access node of the packet data network; and in response to the mobile terminal entering one of the areas forming said PRA list, switching from the standby mode to the connected mode, and sending a notification to said mobility management entity via the at least one access node of the packet data network;

the mobility management entity, which comprises:

a second processor; and a second non-transitory computer-readable medium comprising instructions stored thereon, which when executed by the second processor configure the mobility management entity to perform acts comprising:

sending, to the at least one access node of the packet data network to which the mobile terminal is connected, in response to said mobile terminal switching from the connected mode to the standby mode, said PRA list, configured as a function of a given service and of a location of the mobile terminal; and the at least one access node, each access node of the at least one access nodes comprising:

a third processor; and a third non-transitory computer-readable medium comprising instructions stored thereon, which when executed by the third processor configure the access node to perform acts comprising:

sending, to the mobile terminal, in response to said mobile terminal switching from the connected mode to the standby mode, said PRA list.

10. The packet data network according to claim 9, wherein the mobile terminal receives, in response to the mobile terminal attaching to the packet data network or changing to a new Tracking Area, a Tracking Area List in which the mobile terminal is registered by the packet data network, and wherein the areas belonging to the PRA list are strictly contained in the Tracking Area List.

11. A non-transitory non-removable or partly or fully removable data storage medium, including computer readable program code instructions stored thereon executing a standby state management method when the instructions are executed by a processor of a mobile terminal, wherein the method comprises:

receiving, in response to the mobile terminal switching from a connected mode to a standby mode, a list of areas, called a Presence Reporting Area (PRA) list, from a mobility management entity of a packet data network via at least one access node of the packet data network;

the mobile terminal being registered by the packet data network in a Tracking Area List associated with at least one access node to which the mobile terminal is connected; and in response to the mobile terminal moving, in standby the mode, from one of the areas forming said PRA list to another area of the PRA list, while remaining in the same Tracking Area List;

switching from the standby mode to the connected mode, and sending a tracking area update notification to said mobility management entity via the at least one access node of the packet data network.

12. The non-transitory non-removable or partly or fully removable data storage medium according to claim 11, wherein the instructions configure the mobile terminal to:

receive, in response to the mobile terminal attaching to the packet data network or changing to a new Tracking Area, the Tracking Area List in which the mobile terminal is registered by the packet data network, wherein the areas belonging to, and wherein areas belonging to the PRA list are strictly contained in the Tracking Area List.

* * * * *